United States Patent
Carl, Jr. et al.

(10) Patent No.: US 6,754,955 B1
(45) Date of Patent: Jun. 29, 2004

(54) METHOD OR REPAIRING TRAILING EDGE PORTIONS OF PARTITIONS IN TURBINE DIAPHRAGMS

(75) Inventors: Ralph J. Carl, Jr., Clifton Park, NY (US); John Francis Nolan, Latham, NY (US); Bin Wei, Mechanicville, NY (US); Todd Joseph Fischer, Ballston Spa, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/354,116

(22) Filed: Jan. 30, 2003

(51) Int. Cl.[7] ................................................. B23P 15/00
(52) U.S. Cl. ................ 29/889.1; 29/402.08; 29/402.13; 29/402.16; 205/640; 219/69.11; 219/69.17
(58) Field of Search ........................... 29/889.1, 889.72, 29/402.03, 402.04, 402.05, 402.06, 402.07, 402.08, 402.09, 402.11, 402.13, 402.16, 402.19; 228/119; 416/97 R, 96 R; 204/157.15, 164; 205/640, 668; 219/69.11, 69.1, 69.17

(56) References Cited

U.S. PATENT DOCUMENTS

| | | | | |
|---|---|---|---|---|
| 4,997,534 A | * | 3/1991 | Thornton | 428/469 |
| 5,152,059 A | * | 10/1992 | Midgley | 29/889.7 |
| 5,306,401 A | * | 4/1994 | Fierkens et al. | 415/232 |
| 5,819,400 A | * | 10/1998 | Sargeant | 29/825 |
| 5,820,337 A | * | 10/1998 | Jackson et al. | 415/200 |
| 5,895,205 A | | 4/1999 | Werner et al. | |
| 5,976,330 A | * | 11/1999 | Ziegler et al. | 204/224 M |
| 6,200,439 B1 | * | 3/2001 | Wei et al. | 204/284 |
| 6,234,752 B1 | * | 5/2001 | Wei et al. | 416/96 R |
| 6,267,868 B1 | * | 7/2001 | Wei et al. | 205/648 |
| 6,290,461 B1 | * | 9/2001 | Wei et al. | 416/96 R |
| 6,379,528 B1 | * | 4/2002 | Lee et al. | 205/640 |
| 6,388,223 B2 | * | 5/2002 | Jones et al. | 219/69.17 |
| 6,416,283 B1 | * | 7/2002 | Johnson et al. | 416/97 R |

* cited by examiner

Primary Examiner—I Cuda Rosenbaum
(74) Attorney, Agent, or Firm—Nixon & Vanderhye

(57) ABSTRACT

Using sinker electrode discharge machining tools, damaged portions of partitions of the turbine which have been removed and replaced with weld material of increased thickness may be shaped and contoured to blend with the suction and pressure sides of the partitions. The diaphragm containing the partitions is located in a tank containing dielectric material. A numerically controlled EDM machine directs first and second sinker EDM tools having surfaces corresponding to designed surfaces of the trailing edge portions of the partitions applied to contour and shape the opposite surfaces of the weld material to blend with the pressure and suction sides of the partitions. A third EDM tool is used to shape the juncture at opposite ends of each partition with the arcuate surfaces of the inner and outer bands.

22 Claims, 5 Drawing Sheets

METHOD OR REPAIRING TRAILING EDGE PORTIONS OF PARTITIONS IN TURBINE DIAPHRAGMS

BACKGROUND OF THE INVENTION

The present invention relates to a method of repairing trailing edge portions of partitions of turbines damaged during use and particularly relates to a method of reestablishing the trailing edge portion to a desired trailing edge configuration for each partition undergoing repair using sinker electrode discharging machining techniques.

Partitions for turbine diaphragms typically become damaged during extended use. For example, in steam turbines, erosion and foreign particle impingement on the partitions result in a change in the area through which the steam passes and improper direction of the steam flow relative to subsequent rotor stages. The damage to the partitions results in loss of turbine efficiency and oftentimes vibration. The critical component of the partition is the trailing edge. During regular scheduled outages, steam turbines are usually overhauled to repair damage to the diaphragm partitions, particularly the trailing edges, and other components.

Reshaping the partitions to the designed and desired trailing edge configuration has been a manually intensive operation requiring removal of the damaged material along the trailing edge, addition of new material by a welding operation and final contouring of the repaired partition to the desired design shape. The final contouring is a manual operation with high associated labor costs. Also, diaphragm repair is the rate limiting step that determines the length of the repair and hence the outage. It will be appreciated that minimum outage times are desirable in order to place the repaired turbine back into service as soon as possible.

The partitions are typically repaired by first removing the damaged trailing edge portions of the partitions. For example, the damaged trailing edge portion is ground from the trailing edge toward the leading edge over a distance. conventionally about 0.5 inches. New metal of the proper contour must then be installed in place of the removed damaged section. Weld material is thus applied to take the place of the removed damaged trailing edge portion. The weld material is typically applied to a thickness greater than the designed thickness to enable the built-up weld material to be smoothly contoured into the designed configuration on both the pressure and suction sides of the partition. The weld material, contouring and finishing for each partition is, however, manually labor-intensive and requires extensive processing time. Because outages are expensive to users of turbines and because skilled labor utilized to contour the repaired partitions is limited and costly, it is highly desirable to provide a more efficient and faster repair method which will result in partitions having repaired trailing edge configurations corresponding to the design configurations, as well as to reduce the time required to repair the diaphragm.

BRIEF DESCRIPTION OF THE INVENTION

In accordance with a preferred embodiment of the present invention, the diaphragms are removed from the turbine and the damaged trailing edge portions of the partitions identified for repair are removed. For example, the damaged trailing edge portions can be ground to remove those portions, leaving a remaining portion of the partition, i.e., the leading edge and a substantial portion of the original partition between the leading and trailing edges. Weld material is then added to each of the partitions undergoing repair to replace the removed damaged trailing edge portion and reestablish a trailing edge portion. The weld material is added along the pressure and suction sides of the partition undergoing repair in excess of the desired trailing edge configuration.

To efficiently and economically contour the added weld material to the desired configuration of the repaired partition, a dielectric tank for containing a liquid dielectric such as water or kerosene is provided. A gantry-type CNC-controlled sinker electrode discharge machining machine with an articulating head is also provided and located for disposition of the machining head in the dielectric of the tank. The articulating head is linearly displaceable along X, Y and Z coordinate axes and pivotable about those axes. The head includes an interchangeable electrode holder for mounting sinker EDM tools. By sinker EDM tools is meant tools provided in the reverse image of the shape to be machined.

Once the weld material has been applied to the partitions undergoing repair and the diaphragm with the trailing edge portions of the partitions reestablished by the addition of weld material thereto is located within the dielectric tank, the sinker EDM machine is employed to contour the pressure and suction sides of the partitions to the designed configuration and also to refinish the junctures of the repaired partitions with each of the inner and outer bands of the diaphragm. To accomplish the foregoing, and with the diaphragm in the dielectric tank, a first tool is applied to the articulating head. The first tool has a tool surface shape corresponding to the designed shape of the suction side of the trailing edge of the partition. By applying the suction side sinker EDM tool to the suction side of the trailing edge reestablished by the addition of the weld material, the contour of the weld material is shaped and smoothed to form the continuous suction side surface of each partition upon actuation of the EDM machine. Preferably, the suction sides of all of the trailing edges undergoing repair are contoured prior to contouring all of the pressure sides of the trailing edges.

It will be appreciated that because a chill plate was employed on the pressure side as a basis for adding the weld material, the shape of the pressure side of the trailing edge after welding closely approximates the desired final design shape thereof. Consequently, only a very small portion of the added weld material along the pressure side requires removal in order to smooth the weld beads and restore the correct throat area between the repaired and an adjacent partition. Because the throat gap is typically very small, a copper sinker EDM tool having a surface corresponding to the desired surface along the pressure side of the repaired trailing edge is utilized. With the copper plate having a surface shaped to correspond to the pressure side of the repaired trailing edge applied against the reestablished trailing edge with the weld material, electrode discharge machining is performed to shape and contour the pressure side of the trailing edge.

After each pressure side is machined, a third sinker EDM tool having a surface corresponding to the juncture of the suction side and an arcuate surface of the band is deployed. The tool renders the junctures at opposite ends of the partition and the respective inner and outer bands at an angular relation, e.g., generally perpendicular, to one another.

In a preferred embodiment according to the present invention, there is provided a method of repairing a trailing edge portion of partitions forming part of a diaphragm for a turbine, comprising (a) removing a damaged trailing edge portion of one of the partitions, leaving a remaining portion of the one partition in the diaphragm, (b) adding weld material to the one partition to replace the removed damaged trailing edge portion and reestablish a trailing edge portion on the one partition, the added weld material along pressure and suction sides of the reestablished trailing edge portion of the one partition being in excess of a desired trailing edge configuration for the one partition, (c) immersing at least the one partition having the added weld material into a liquid dielectric and (d) using discrete tools on the pressure and suction sides, respectively, of the one partition while the one partition and tools are immersed in the liquid dielectric, electrode discharge machining the pressure and suction sides of the reestablished trailing edge portion to a predetermined shape to form the desired trailing edge configuration.

In a further preferred embodiment according to the present invention, there is provided a method of repairing trailing edge portions of partitions forming part of a diaphragm for a turbine, comprising (a) removing damaged trailing edge portions of the partitions requiring repair, leaving remaining portions of the partitions undergoing repair in the diaphragm, (b) adding weld material to the remaining portions of the partitions to replace the removed damaged trailing edge portions and reestablish trailing edge portions therealong, the added weld material along pressure and suction sides of the reestablished trailing edge portion of the one partition at least corresponding generally to a desired trailing edge configuration for the one partition, (c) immersing the diaphragm with the partitions having the added weld material into a liquid dielectric and (d) using a tool on each of the pressure and suction sides, respectively, of the partitions having the added material and while immersed in the liquid dielectric, electrode discharge machining the pressure and suction sides of the reestablished trailing edge portions to predetermined shapes to form the desired trailing edge configurations.

DETAILED DESCRIPTION OF THE INVENTION

Figure 1:
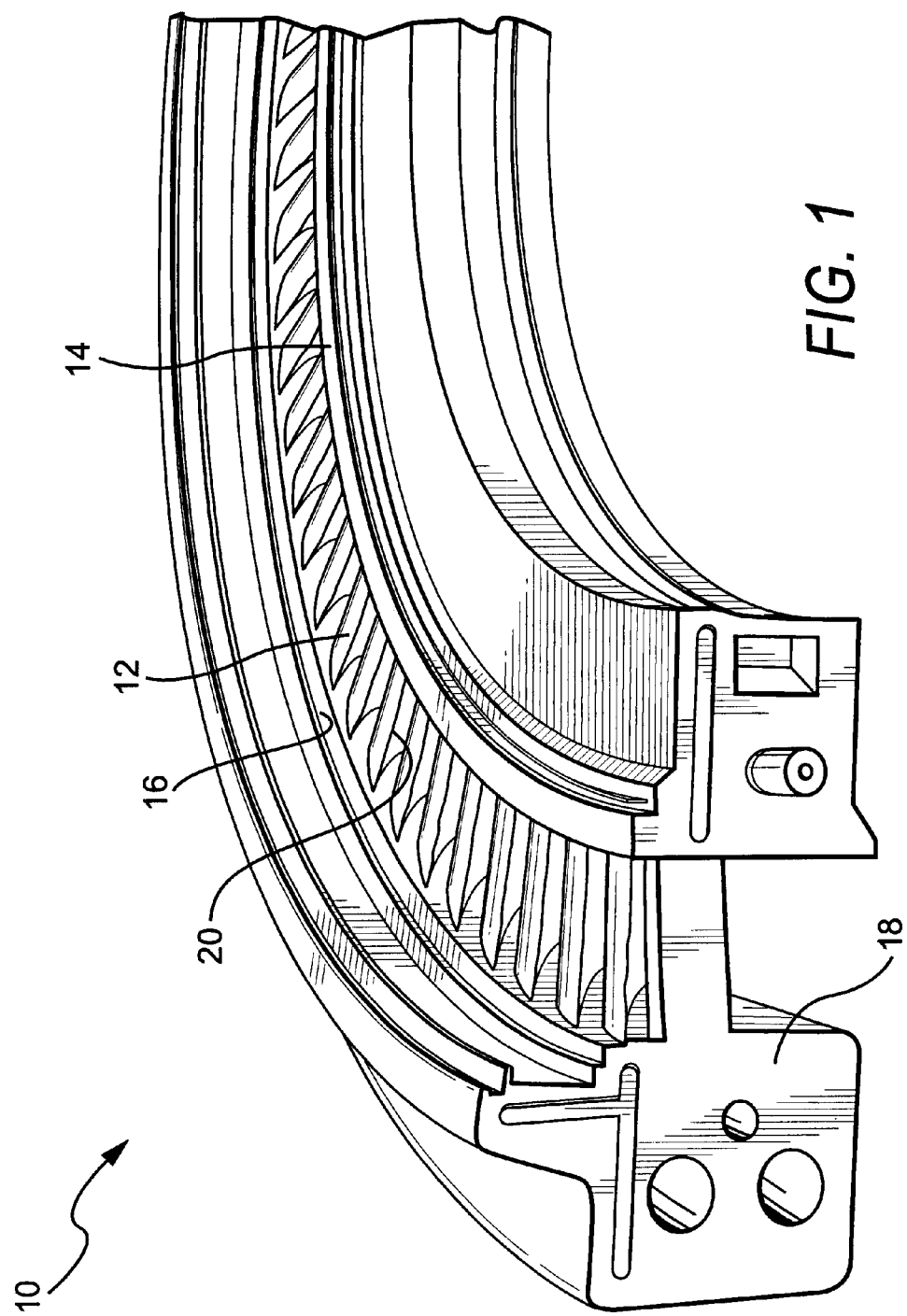
FIG. 1 is a fragmentary perspective view of a portion of a diaphragm having damaged partitions for undergoing repair in accordance with a preferred embodiment of the present invention.

Referring now to FIG. 1, there is illustrated a diaphragm, generally designated 10, having a plurality of partitions 12, i.e., airfoils, disposed between inner and outer bands 14 and 16, respectively, of the diaphragm 10. The diaphragm 10 is, of course, illustrated removed from the turbine and it will be appreciated that a typical diaphragm extends for 180° and is secured to a generally corresponding diaphragm at the horizontal midline joint, designated 18, to form a full 360° annular stator stage, for example, for a steam turbine. As illustrated in FIG. 1, the partitions 12 have trailing edge portions 20 which have been damaged through use, e.g., erosion, foreign particle infringement, corrosion or any one or more of a number of conditions which cause, over time, a change in the throat area between adjacent partitions and, hence, reduce turbine efficiency.

Figure 2:
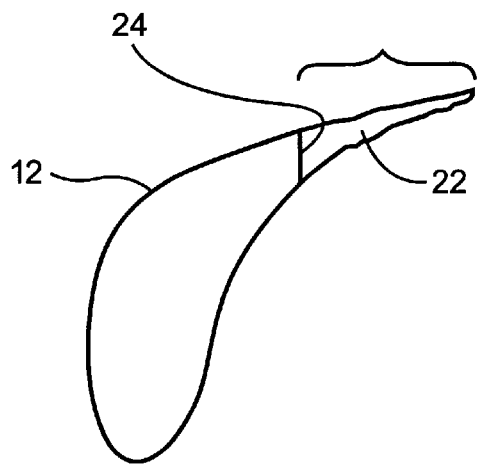
FIG. 2 is a schematic representation of the cross-section of a partition with a damaged trailing edge portion.
Figure 3:
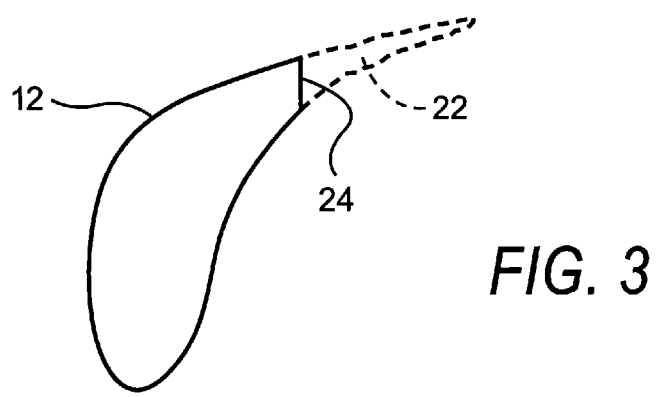
FIG. 3 is a schematic representation of the cross-section of the partition with the damaged trailing edge portion removed.

FIG. 2 represents a cross-section of an individual partition 12 having a damaged trailing edge portion 22, as emphasized by the rough lines defining the damaged trailing edge portion 22. It will be appreciated that one or more of the partitions 12 of the diaphragm 10 may be damaged and subject to repair. To effect the repair in accordance with a preferred embodiment of the present invention, the damaged portion of the partition, i.e., the damaged trailing edge portion 22 illustrated in FIG. 2, is removed, for example, along a cutline 24. The removal can be effected by disposing the diaphragm 10 on a workbench and grinding the trailing edges of the damaged partitions undergoing repair. Each partition 12 with the damaged trailing edge portion 22 removed is illustrated in FIG. 3. It will be appreciated that all of the trailing edge portions of the damaged partitions are removed.

Figure 4:
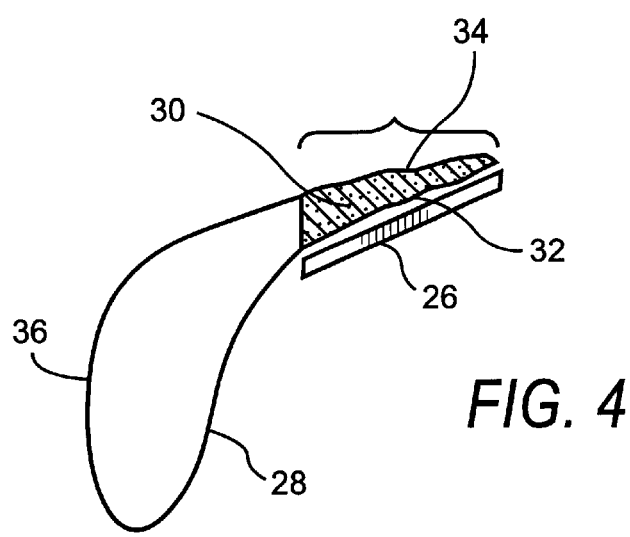
FIG. 4 is a view similar to FIG. 2 illustrating the addition of weld material in place of the removed damaged trailing edge portion.
Figure 5:
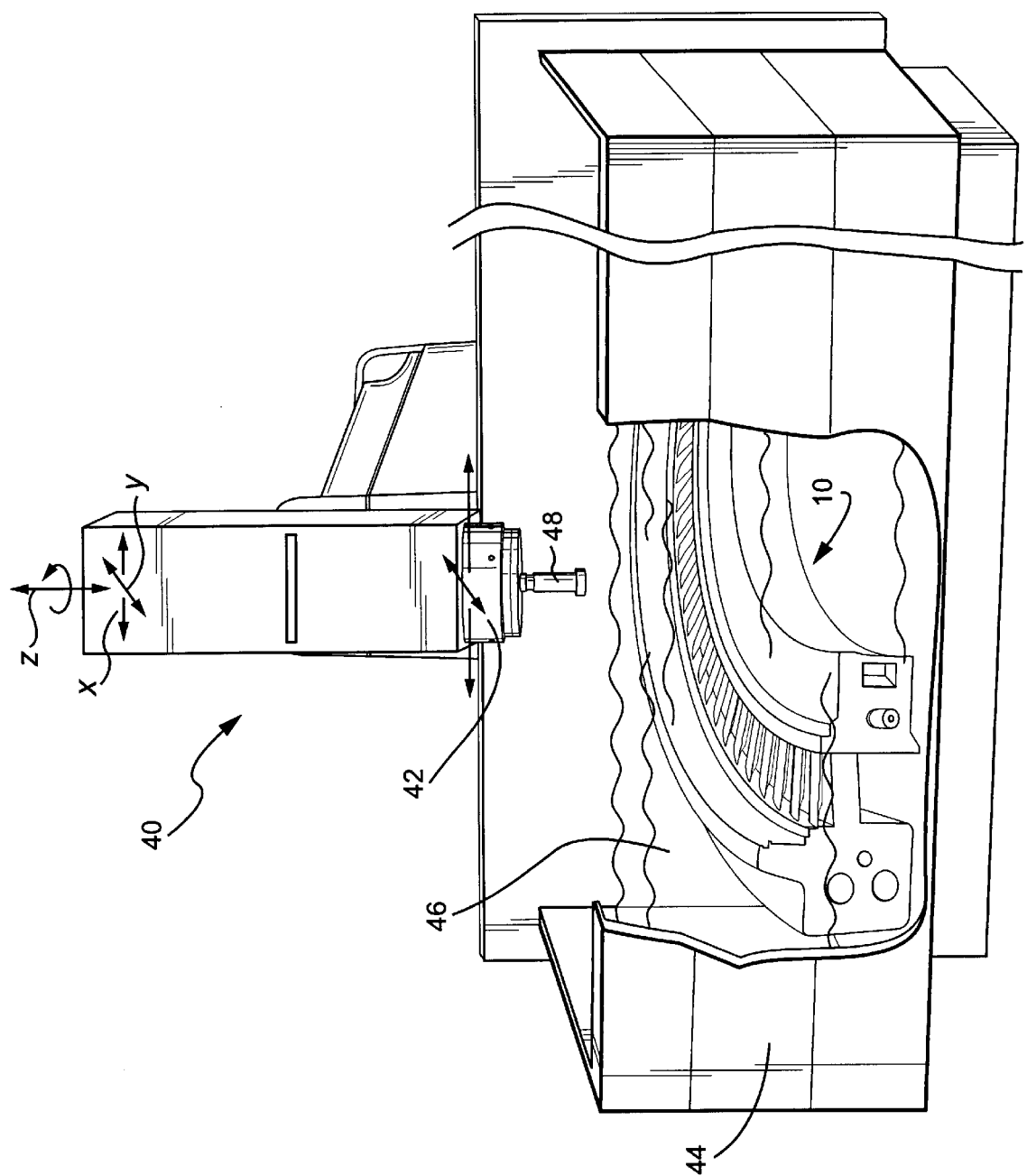
FIG. 5 is a schematic perspective view illustrating a sinker electrode discharge machining gantry and a dielectric tank with portions broken away illustrating the partition undergoing repair within the tank.

Referring now to FIG. 4, a chill plate 26 is disposed along the pressure side 28 of the partition in the region in opposition to the removed portion 22 of the trailing edge. Weld material 30 is applied against the chill plate 26 and built up to a thickness sufficient to replace the removed damaged trailing edge portion 22 and sufficient to have surfaces 32 and 34 on the pressure and suction sides 28 and 36, respectively, of the partition in excess of a desired trailing edge configuration. For example, the desired trailing edge configuration can be an originally designed configuration for the partitions of a particular turbine. Once the weld build-up material 30 has been added to each of the partitions undergoing repair, and the copper chill plate removed from the pressure side of the trailing edge of the partition, the weld material of the partitions is ready for contouring to the desired trailing edge configuration.

To finish the repair of the partitions, there is provided a gantry-type CNC-controlled EDM machine, generally designated 40, having an articulated head 42 on which various tools of the sinker EDM type are selectively disposed. The machine 40 and particularly the head 42 is disposed to overlie a tank 44 containing a liquid dielectric 46, such as water or kerosene. The tank 44 is of sufficient volume to receive the entirety of the diaphragm half, which is illustrated in the tank 44. The EDM machine is movable linearly in X, Y and Z directions indicated by the arrows correspondingly designated and also about pitch and yaw axes, as well as a vertical axis of rotation. The articulated head 42 is illustrated with a sinker EDM tool 48 disposed in the head ready for application to the diaphragm 10.

Figure 6:
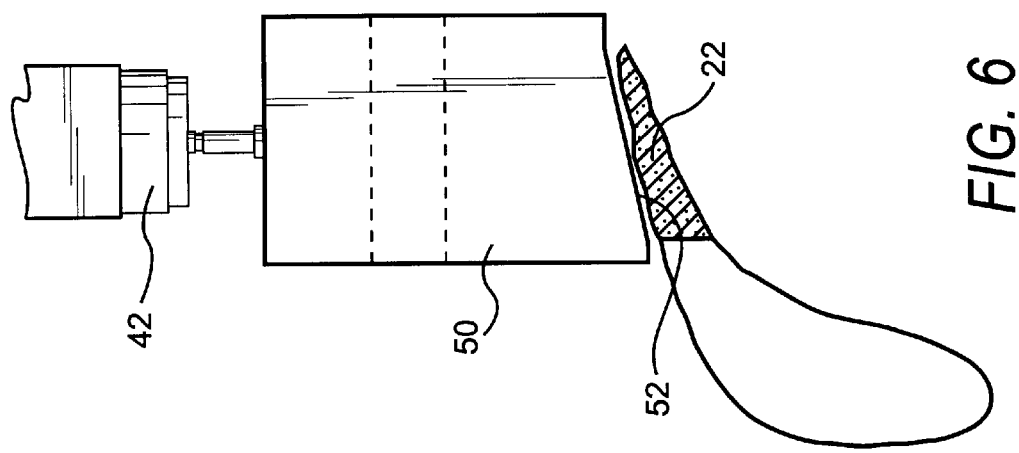
FIG. 6 is a view similar to FIG. 4 illustrating a sinker EDM tool for contouring the applied trailing edge weld material along the suction side.

With the diaphragm 10 disposed within the tank 44 and submerged in the dielectric material 46, a first sinker EDM tool 50 (FIG. 6) having a tool surface 52 contoured to substantially correspond to the final desired trailing edge configuration along the suction side of the trailing edge is brought into contact with the suction side of the added weld material 22. By activating the EDM machine, the suction surface of the added weld material 22 is shaped and contoured to the desired configuration and blended with the remaining portion of the suction side of the partition undergoing repair. By manipulating the machine 40 about the diaphragm, it will be appreciated that the tool 50 is applied to each of the partitions undergoing repair to shape and contour the suction side surface of the added weld material along the trailing edge.

Figure 7:
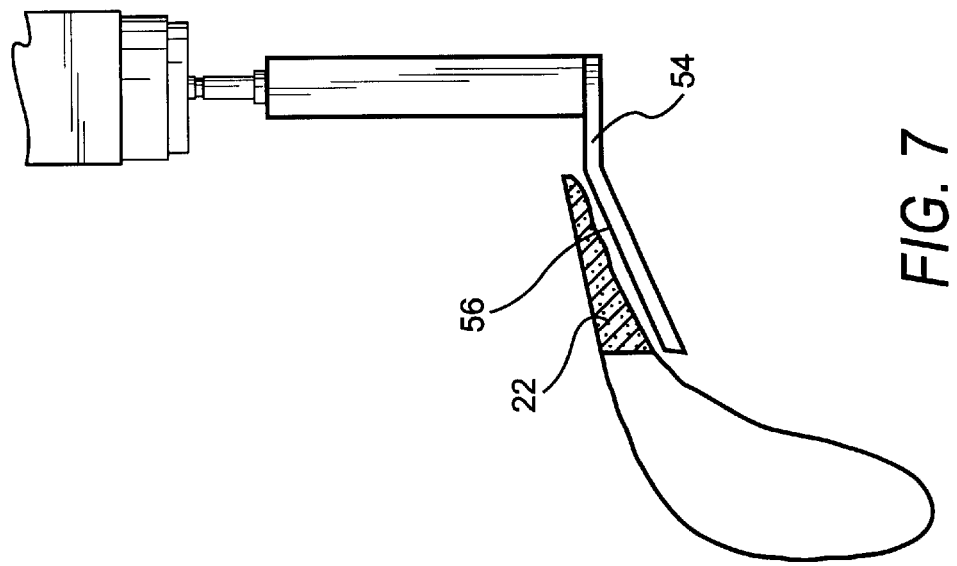
FIG. 7 is a view similar to FIG. 4 illustrating a sinker EDM tool for contouring the applied weld material along the pressure side.

Once the suction side of the trailing edge surfaces are contoured and shaped, the pressure side surfaces of the added material 22 are shaped and contoured. To accomplish that, a second tool 54 (FIG. 7) having a tool surface 56 shaped generally to correspond to the designed and desired trailing edge configuration along the pressure side of the trailing edge of the repaired partition is applied to the articulated head and applied to the suction side of the weld material 22. Upon activation of the EDM machine, the suction side surface of the material 22 is shaped and contoured to the desired trailing edge configuration for blending with the remaining portions of the suction side surface of the partition. Each partition is similarly machined along the suction side surface. It will be appreciated that to accomplish the EDM machining along the suction side of the trailing edge portion, the tool 54 must be inserted between the partition undergoing repair and an adjacent partition and through and into the throat area between the partitions. Because a carbon electrode might be too fragile or brittle for use in that confined area, a copper electrode is preferred as the sinker EDM tool 54. Once the tool 54 contours and shapes the suction side surfaces of the added weld material 22 along the trailing edges, it will be appreciated that both the suction and pressure sides of the partition are shaped and contoured into the designed and desired trailing edge configuration with the appropriate gap between adjacent partitions, except for regions at the juncture of the repaired partitions and the arcuate surfaces of the inner and outer bands.

Figure 8:
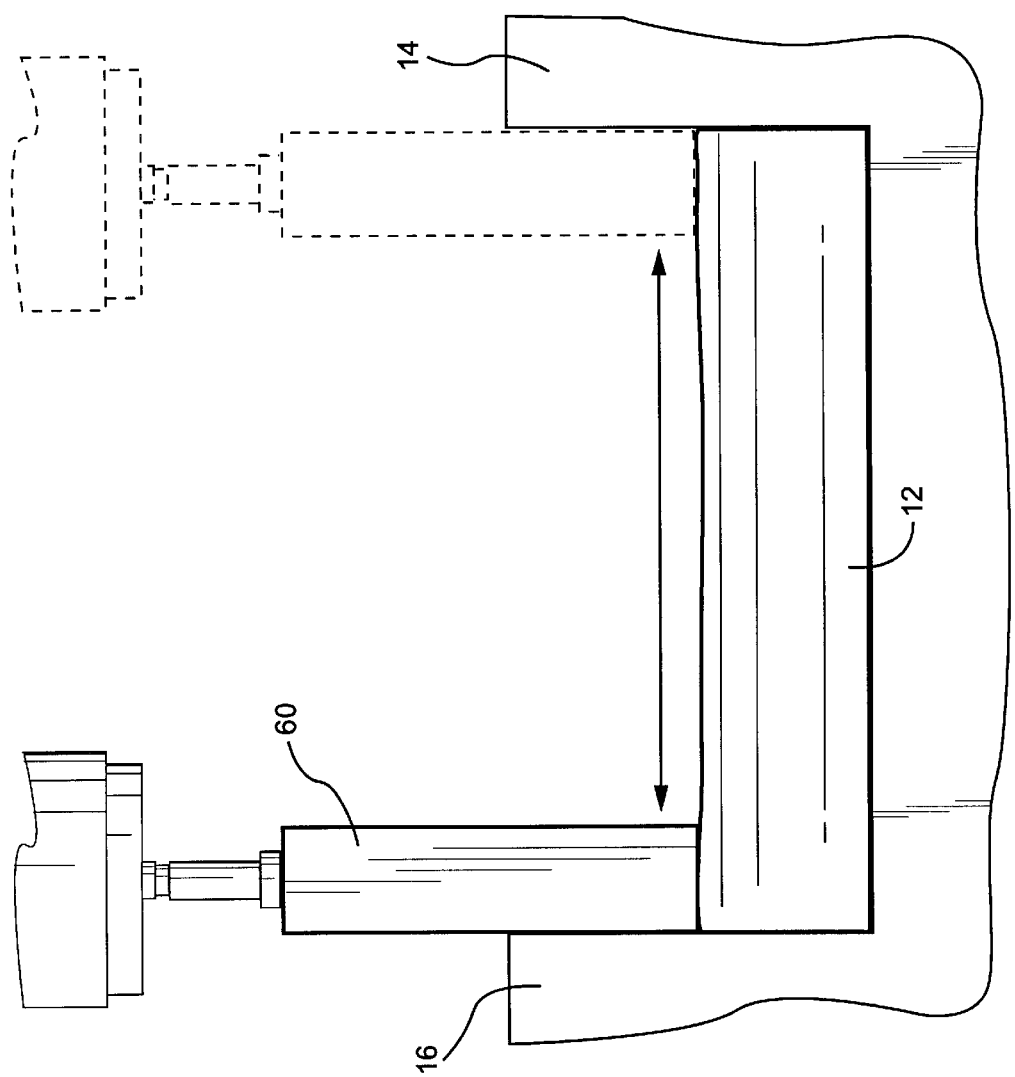
FIG. 8 is a schematic representation of a partition between inner and outer bands with a third sinker EDM tool for contouring the junctures of the partition and the arcuate surfaces of the bands.

Referring to FIG. 8, and to provide an appropriately contoured surface at that juncture, a third sinker EDM tool 60 is secured to the articulating head 42. The tool 60 may be disposed along the suction side of the repaired partition to engage both the repaired suction side of the partition and the arcuate surface of one of the inner and outer bands 14 and 16, respectively, and displaced to shape the juncture therebetween. Preferably, and as illustrated in FIG. 8, the surface at any point between the partition and the arcuate surface of the inner or outer band are angularly related to one another, e.g., generally perpendicular to one another. The tool 60 is shaped to provide that angular relationship. By displacing the tool 60 from one end of the partition to its opposite end, the juncture of the partition with the inner and outer bands can be shaped and contoured as desired. Once the tool 60 has been applied to all of the partitions subject to repair and the inner and outer bands, the diaphragm may be removed from the tank 44 and returned to service.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of repairing a trailing edge portion of partitions forming part of a diaphragm for a turbine, comprising:
   (a) removing a damaged trailing edge portion of one of the partitions, leaving a remaining portion of said one partition in the diaphragm;
   (b) adding weld material to the one partition to replace the removed damaged trailing edge portion and reestablish a trailing edge portion on the one partition, the added weld material along pressure and suction sides of the reestablished trailing edge portion of the one partition being in excess of a desired trailing edge configuration for the one partition;
   (c) immersing at least the one partition having the added weld material into a liquid dielectric; and
   (d) using discrete tools on the pressure and suction sides, respectively, of the one partition while the one partition and tools are immersed in the liquid dielectric, electrode discharge machining the pressure and suction sides of the reestablished trailing edge portion to a predetermined shape to form the desired trailing edge configuration.

2. The method according to claim 1 including, prior to step (b), disposing a chill plate at a location along the pressure side of the one partition generally corresponding to the desired trailing edge configuration thereof and in registration with the space left by the removed damaged trailing edge portion.

3. The method according to claim 2 including maintaining the chill plate at said location while the weld material is added to reestablish the trailing edge portion.

4. The method according to claim 1 wherein step (d) includes (e) deploying a sinker electrode discharge machining tool having a machining tool surface substantially corresponding in shape to the desired trailing edge configuration for the one partition along the suction side of the reestablished trailing edge portion of the one partition to reshape the suction side thereof and actuating the tool to machine the reestablished trailing edge portion to the desired trailing edge configuration thereof.

5. The method according to claim 4 including performing steps (a)–(d) on all partitions of the diaphragm requiring repair including by immersing the diaphragm into the liquid dielectric, and performing step (d) by applying the sinker electrode discharge machining tool against the reestablished trailing edge portion of each partition undergoing repair on the suction side thereof prior to using the tool to form the desired trailing edge configuration along the pressure sides thereof.

6. The method according to claim 1 wherein step (d) includes deploying a sinker electrode discharge machining tool having a machining tool surface substantially corresponding in shape to the desired trailing edge configuration for the one partition along the pressure side thereof against the reestablished trailing edge portion of the one partition to reshape the pressure side thereof upon actuation of the electrode discharge machining tool.

7. The method according to claim 6 including inserting the sinker electrode discharge machining tool between the one partition and an adjacent partition in the diaphragm to engage the sinker electrode discharge machining tool against the pressure side of the reestablished trailing edge portion.

8. The method according to claim 6 including performing steps (a)–(d) on all partitions of the diaphragm requiring repair including by immersing the diaphragm into the liquid dielectric and inserting the sinker electrode discharge machining tool between each partition undergoing repair and an adjacent partition to engage the sinker electrode discharge machining tool against the pressure side of the reestablished trailing edge portion of each partition.

9. The method according to claim 1 wherein step (d) includes (e) deploying a sinker electrode discharge machining tool having a machining tool surface substantially corresponding in shape to the desired trailing edge configuration for the one partition along the suction side of the reestablished trailing edge portion of the one partition to reshape the suction side thereof and actuating the tool to machine the reestablished trailing edge portion to the desired trailing edge configuration thereof, wherein step (d) includes deploying a sinker electrode discharge machining tool having a machining tool surface substantially corresponding in shape to the desired trailing edge configuration for the one partition along the pressure side thereof against the reestablished trailing edge portion of the one partition to reshape the pressure side thereof upon actuation of the electrode discharge machining tool.

10. The method according to claim 9 including performing steps (a)–(d) on all partitions of the diaphragm requiring repair including by immersing the diaphragm into the liquid dielectric, performing step (d) by applying the sinker electrode discharge machining tool against the reestablished trailing edge portion of each partition undergoing repair on the suction side thereof prior to using the tool to form the desired trailing edge configuration along the pressure side thereof.

11. The method according to claim 9 including inserting the sinker electrode discharge machining tool between the one partition and an adjacent partition in the diaphragm to engage the sinker electrode discharge machining tool against the pressure side of the reestablished trailing edge portion.

12. The method according to claim 1 including immersing the diaphragm in the dielectric, engaging a corner sinker electrode discharge machining tool having a shaped surface at the juncture of the reestablished trailing edge portion and one of an inner and outer band forming part of the diaphragm to establish a generally perpendicular relation between the suction side of the repaired trailing edge and an arcuate surface of said one band.

13. The method according to claim 12 including displacing the corner tool to a location at the juncture of another of said bands and the reestablished trailing edge portion to establish a generally perpendicular relation between the suction side of the repaired trailing edge and an arcuate surface of said another band.

14. The method according to claim 1 including performing steps (a)–(d) on all partitions of the diaphragm requiring repair and step (d) includes electrode discharge machining the sides of the reestablished trailing edge portions of the partitions to form a predetermined gap between each reestablished trailing edge portion and an adjacent partition.

15. A method of repairing trailing edge portions of partitions forming part of a diaphragm for a turbine, comprising:
(a) removing damaged trailing edge portions of the partitions requiring repair, leaving remaining portions of the partitions undergoing repair in the diaphragm;
(b) adding weld material to the remaining portions of the partitions to replace the removed damaged trailing edge portions and reestablish trailing edge portions therealong, the added weld material along pressure and suction sides of the reestablished trailing edge portion of the one partition at least corresponding generally to a desired trailing edge configuration for the one partition;
(c) immersing the diaphragm with the partitions having the added weld material into a liquid dielectric; and
(d) using a tool on each of the pressure and suction sides, respectively, of the partitions having the added material and while immersed in the liquid dielectric, electrode discharge machining the pressure and suction sides of the reestablished trailing edge portions to predetermined shapes to form the desired trailing edge configurations.

16. The method according to claim 15 wherein step (d) includes (e) deploying a sinker electrode discharge machining tool having a machining tool surface substantially corresponding in shape to the desired trailing edge configuration for the partitions along the suction sides of the reestablished trailing edge portions thereof to reshape the suction sides thereof, and actuating the tool to machine the reestablished trailing edge portions to the desired trailing edge configuration thereof.

17. The method according to claim 15 wherein step (d) includes deploying a sinker electrode discharge machining tool having a machining tool surface substantially corresponding in shape to the desired trailing edge configuration for the partitions along the pressure sides thereof against the reestablished trailing edge portion of the partitions to reshape the pressure sides thereof upon actuation of the electrode discharge machining tool.

18. The method according to claim 17 including inserting the sinker electrode discharge machining tool between the partitions and adjacent partitions in the diaphragm to engage the sinker electrode discharge machining tool against the pressure side of the reestablished trailing edge portion of each partition.

19. The method according to claim 15 wherein step (d) includes (e) deploying a sinker electrode discharge machining tool having a machining tool surface substantially corresponding in shape to the desired trailing edge configuration for the partitions along the suction sides of the reestablished trailing edge portions thereof to reshape the suction sides thereof and actuating the tool to machine the reestablished trailing edge portion to the desired trailing edge configuration thereof, wherein step (d) includes deploying a sinker electrode discharge machining tool having a machining tool surface substantially corresponding in shape to the desired trailing edge configuration for the partitions along the pressure sides thereof against the reestablished trailing edge portions of the partitions to reshape the pressure sides thereof upon actuation of the electrode discharge machining tool.

20. The method according to claim 15 including engaging a corner sinker electrode discharge machining tool having a shaped surface at the junctures of the reestablished trailing edge portions and one of an inner and outer band forming part of the diaphragm to establish a predetermined angular relation between the suction sides of the repaired trailing edges and an arcuate surface of said one band.

21. The method according to claim 20 including displacing the corner tool to a location at the juncture of another of said bands and the reestablished trailing edge portions to establish a predetermined angular relation between the suction sides of the repaired trailing edges and an arcuate surface of said another band.

22. The method according to claim 15 wherein step (d) includes electrode discharge machining the sides of the reestablished trailing edge portions of the partitions to form a predetermined gap between each reestablished trailing edge portion and an adjacent partition.

* * * * *

UNITED STATES PATENT AND TRADEMARK OFFICE
CERTIFICATE OF CORRECTION

PATENT NO. : 6,754,955 B1
DATED : June 29, 2004
INVENTOR(S) : Carl et al.

It is certified that error appears in the above-identified patent and that said Letters Patent is hereby corrected as shown below:

<u>Title page, Item [54] and Column 1, line 1,</u>
Title, delete "METHOD OR" and insert -- METHOD OF --.

Signed and Sealed this

Tenth Day of August, 2004

JON W. DUDAS
*Acting Director of the United States Patent and Trademark Office*